United States Patent [19]
Armstrong

[11] Patent Number: 5,461,385
[45] Date of Patent: Oct. 24, 1995

[54] RF/ID TRANSPONDER SYSTEM EMPLOYING MULTIPLE TRANSPONDERS AND A SENSOR SWITCH

[75] Inventor: William E. Armstrong, Mission Viejo, Calif.

[73] Assignee: Hughes Identification Devices, Inc., Tustin, Calif.

[21] Appl. No.: 236,598

[22] Filed: Apr. 29, 1994

[51] Int. Cl.$^6$ .................................................... G01S 13/74
[52] U.S. Cl. ................... 342/42; 342/44; 342/50
[58] Field of Search .................. 342/42, 44, 50

[56] References Cited

U.S. PATENT DOCUMENTS 5,053,774  10/1991  Schuermann et al. ............. 342/44
5,311,185   5/1994  Hochstein et al. .................. 342/44

*Primary Examiner*—J. Woodrow Eldred
*Attorney, Agent, or Firm*—Terje Gudmestad; W. K. Denson-Low

[57] ABSTRACT

An improved identification system that employs a novel radio frequency (RF) transponder. The RF transponder comprises a plurality of integrated circuit transponder chips, an RF transmit antenna coupled to an RF output of each of the transponder chips, and a sensor coupled to each of the plurality of transponder chips. A sensor switch is coupled between each of the transponder chips and the RF transmit antenna. The plurality of transponder chips may be individually programmed with different information, or identical information except for one bit. A code reader is coupled to an RF receive antenna for processing data transmitted by the transponder. The transponder is used to transfer information to the code reader relating to an item to which the sensor or transponder is coupled and the condition of the sensor switch. Transmission is accomplished by way of an RF communications link using the RF transmit and receive antennas. The transponder and identification system may thus be used with any application requiring sensor switch information and/or multiple sets of data.

3 Claims, 1 Drawing Sheet

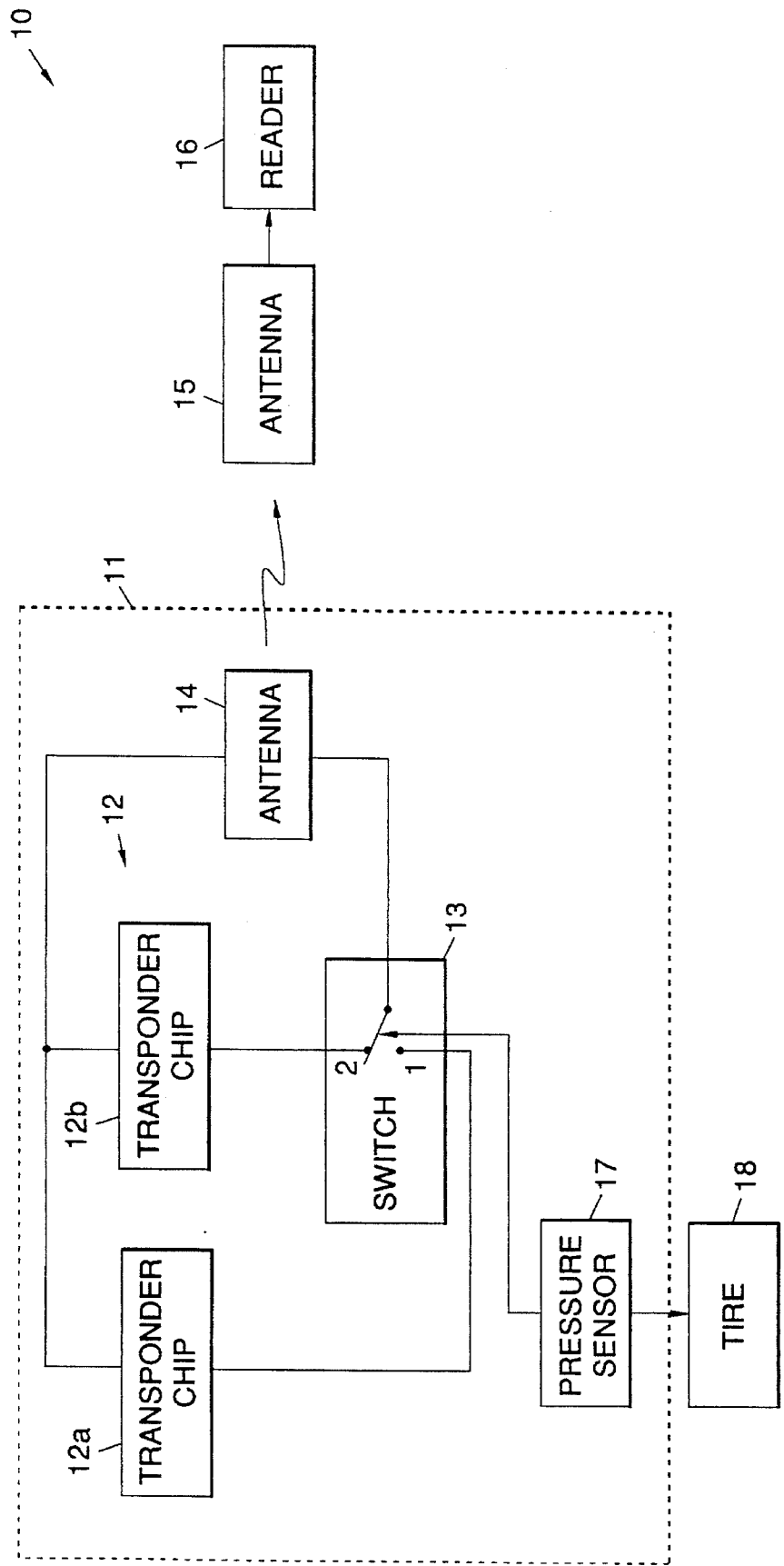

5,461,385

RF/ID TRANSPONDER SYSTEM EMPLOYING MULTIPLE TRANSPONDERS AND A SENSOR SWITCH

BACKGROUND

The present invention relates generally to identification systems, and more particularly, to an identification system that comprises an RF transponder employing a plurality of transponder chips and a sensor switch for for providing multiple readouts.

The assignee of the present invention manufactures radio frequency (RF) identification systems that include a transponder and a code reader that are coupled by an RF communication link. The transponder comprises a transponder integrated circuit chip whose RF output is coupled to an RF transmit antenna. Data relating to an item is prestored in the transponder chip. The transponder chip is coupled to a sensor that is used to trigger the chip to transmit the stored data. The balance of the identification system includes a code reader that is remotely located from the transponder that is coupled to an RF receive antenna. When the transponder chip is activated, the data is transmitted from the transponder chip to the reader by way of the RF transmit and receive antennas comprising the RF communications link.

Conventional identification systems typically employ a powered sensor coupled to a single transponder chip that is used to process analog information derived from the sensor. The sensor is powered by transponder chip, and is read and interpreted by the transponder chip. This transponder arrangement generates detailed information derived from the sensor, but requires added power and the use of relatively sophisticated and expensive processing techniques in order to read and interpret the sensor data. Furthermore, only one set of data is provided by conventional systems.

Therefore, it is an objective of the present invention to provide for a identification system employing an improved transponder that employs multiple RF transponder chips and sensor switch that provides for transmission of a plurality of distinct sets of data.

SUMMARY OF THE INVENTION

The present invention is an improved identification system that employs a novel radio frequency (RF) transponder. The RF transponder comprises a plurality of integrated circuit transponder chips, and an RF transmit antenna coupled to an RF output of each of the transponder chips. A sensor, such as a pressure sensor, for example, is coupled to each of the plurality of transponder chips. A sensor switch is coupled between each of the transponder chips and the RF transmit antenna. In a preferred embodiment, the transponder comprises two transponder chips coupled through a double throw, single pole sensor switch to the RF transmit antenna. The plurality of transponder chips may be individually programmed with different information, or identical information except for one bit. An RF receive antenna is provided for receiving transmitted data derived from the transponder. A code reader is coupled to the RF receive antenna for processing data received from the transponder.

In operation, the transponder of the present invention transfers information relating to an item to which it or the sensor is coupled and the condition of the sensor switch to the code reader. This is achieved without the need for a custom transponder integrated circuit that performs a multiplicity of functions. Transmission is accomplished by way of an RF communications link using the RF transmit and receive antennas. The present transponder and identification system may thus be used with any application requiring sensor switch information and/or multiple sets of data.

BRIEF DESCRIPTION OF THE DRAWINGS

The various features and advantages of the present invention may be more readily understood with reference to the following detailed description taken in conjunction with the accompanying drawings, and in which the sole figure of the drawing illustrates a transponder system employing an RF transponder in accordance with the principles of the present invention.

DETAILED DESCRIPTION

Referring to the drawing figure, it shows a preferred embodiment of an identification system 10 employing an RF transponder 11 in accordance with the principles of the present invention. The identification system 10 comprises an RF code reader 16 that is coupled to an RF receive antenna 15. The RF transponder 11 comprises a plurality of transponder integrated circuit chips 12. In the preferred embodiment shown in the drawing figure, and for the purposes of illustration, the RF transponder 11 comprises first and second transponder integrated circuit chips 12a, 12b whose respective RF outputs are coupled through a double throw, single pole sensor switch 13 to an RF transmit antenna 14. It is to be understood that the sensor switch 13 may have multiple poles corresponding to the number of transponder integrated circuit chips 12 that are employed in the system 10. The first and second transponder integrated circuit chips 12a, 12b are coupled to a sensor 17, such as a pressure sensor 17, for example.

The operation of the identification system and RF transponder 11 will be described with reference to its use in processing and managing information relating to tires. It is to be understood that the present invention has many other applications, and that the tire application is used for the purposes of illustration only. When the double throw, single pole sensor switch 13 is moved to a first position (position 1), the first transponder integrated circuit chip 12a is made operational and the second transponder integrated circuit chip 12b is disconnected. When the sensor switch 13 is moved to a second position (position 2), the second transponder integrated circuit chip 12b is made operational and the first transponder integrated circuit chip 12a is disconnected. Thus, data stored in the selected transponder chip 12a, 12b is communicated by way of the RF transmit and receive antennas 14, 15 to the RF code reader 16. The RF code reader 16 then reads the information that is stored in the first or second transponder chip 12a, 12b and that is selected based upon the position of the sensor switch 13.

As an example, consider an application wherein the transponder system 10 is used to process information regarding a truck tire 18. The pressure sensor 17 of the transponder 11 is coupled to the tire 18. The pressure sensor is located in the tire 18, and the transponder 11 is located in the tire 18. When the sensor switch 13 is positioned to select the first transponder integrated circuit chip 12a, that chip 12a might send out a code including tire manufacturer plant code, date code, tire size, tire model, a unique ID code, and pressure sensor switch position=pressure OK. When the sensor switch 13 is positioned to select the second transponder integrated circuit chip 12b, that chip 12b might send out tire manufacturer plant code, date code, tire size, tire model, unique ID code, and pressure sensor switch position=low pressure. Whichever chip 12a, 12b is selected, the data store therein including the relevant data regarding the sensor 17 is transmitted by way of the transmit and receive antennas 14, 15 of the communications link to the reader 16. The reader then processes and/or displays or outputs the information that is read out of the selected chip 12a, 12b.

Thus there has been described a new and improved transponder system employing an improved transponder system that employs an RF transponder and sensor switch and a plurality of transponder chips that provide for transmission of distinct sets of data. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An RF identification system comprising:

a transponder comprising:
      a plurality of transponder integrated circuit chips;
      a sensor coupled to the plurality of transponder chips;
      an RF transmitting antenna coupled to respective RF outputs of the plurality of transponder chips; and
      a sensor switch coupled between the antenna and each of the plurality of transponder chips;

an RF receive antenna for receiving transmitted data from the transponder; and an ID code reader coupled to the RF receive antenna for processing data derived from the transponder.

2. The RF identification system wherein the transponder comprises:

first and second transponder integrated circuit chips; and a double throw, single pole sensor switch coupled to the first and second transponder integrated circuit chips.

3. An RF identification system comprising:

a transponder comprising:
      first and second transponder integrated circuit chips; and
      a sensor coupled to the plurality of transponder chips;
      an RF transmitting antenna coupled to respective RF outputs of the plurality of transponder chips; and
      a double throw, single pole sensor switch coupled between the antenna and the first and second transponder integrated circuit chips;

an RF receive antenna for receiving transmitted data from the transponder; and an ID code reader coupled to the RF receive antenna for processing data derived from the transponder.

\* \* \* \* \*